Aug. 24, 1937.   C. R. ANDERSON   2,091,128
MANUFACTURE OF MINING MACHINE CUTTER BITS
Filed Dec. 1, 1934   2 Sheets-Sheet 1
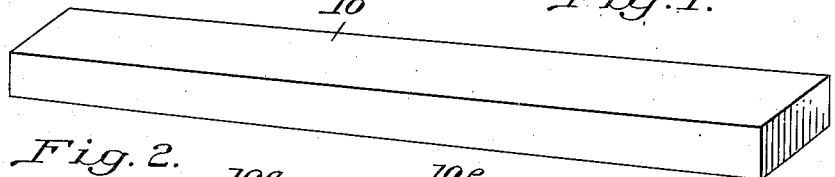
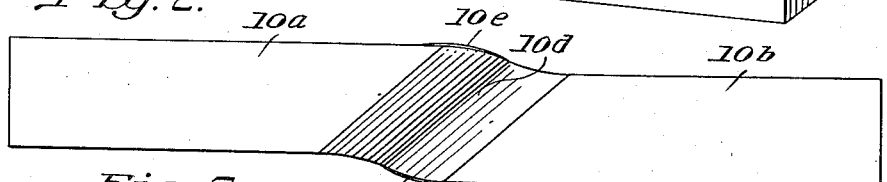
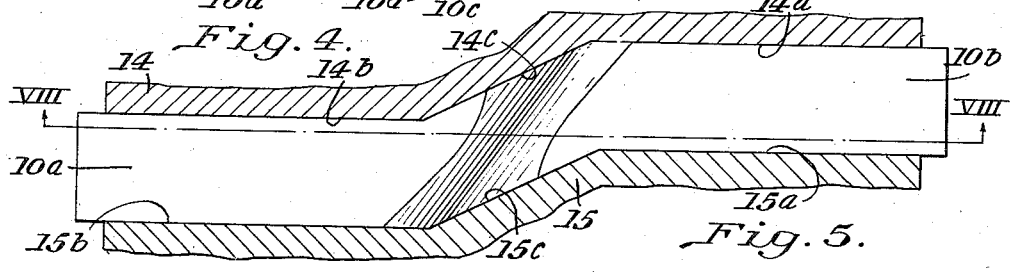
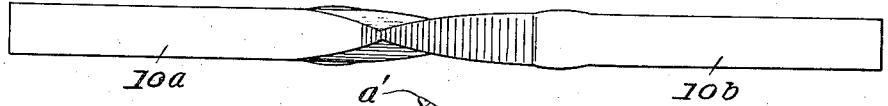
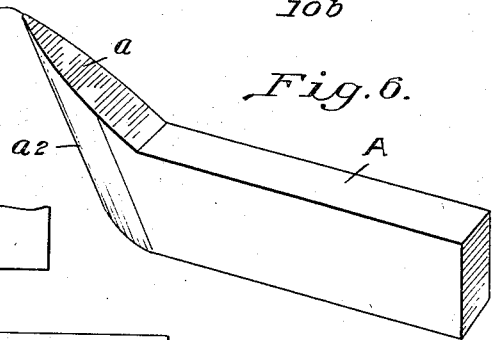
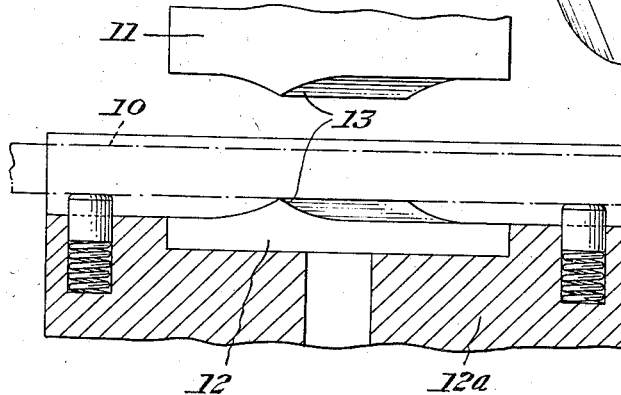
INVENTOR
Cecil R. Anderson
by his attorneys

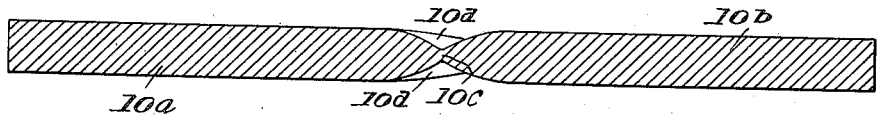
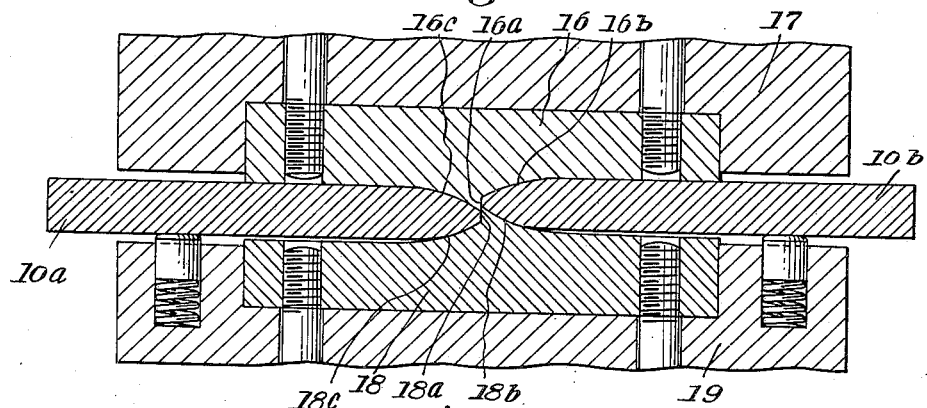
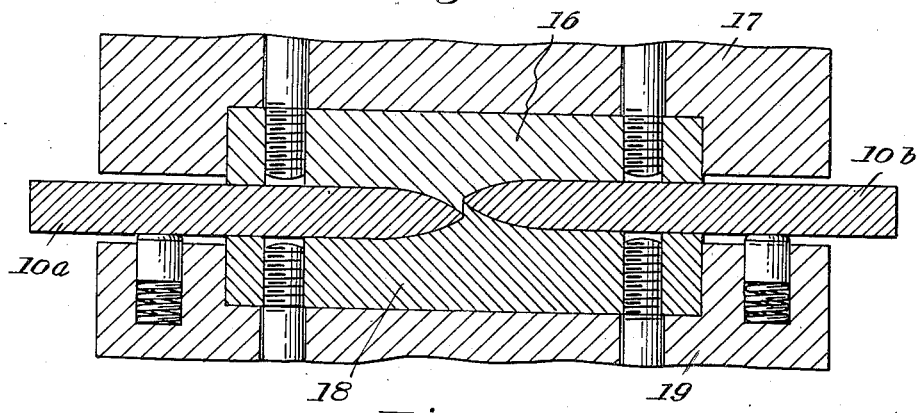
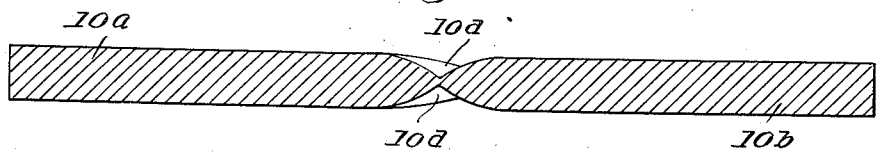

Patented Aug. 24, 1937

2,091,128

UNITED STATES PATENT OFFICE 2,091,128

MANUFACTURE OF MINING MACHINE CUTTER BITS

Cecil R. Anderson, Ben Avon, Pa., assignor to The Martin-Hardsocg Company, Pittsburgh, Pa., a corporation of Pennsylvania Application December 1, 1934, Serial No. 755,608

2 Claims. (Cl. 76—108)

This invention relates to the manufacture of mining machine cutter bits of the conventional type and is for an improved method and apparatus for the production of these bits. The invention constitutes an improvement over the invention disclosed in my copending application Serial No. 615,103, filed June 3, 1932.

As disclosed in my said copending application, it has heretofore been proposed to make cutter bits by taking a piece of bar stock of rectangular cross section corresponding to the cross section of the shank of the cutter bit to be produced, then bending the metal laterally of its width to form an offset therein. This bend has been intermediate the ends of the piece of bar stock, and after the bend has been formed, a diagonal scarf or kerf is formed therein. When the bar is thereafter broken across this scarf or kerf, it forms two complete cutter bits.

This method has certain disadvantages due to the fact that when the bar which has been laterally offset is subjected to pressure under the scarfing dies, it bulges out on the two narrow faces of the bar. This bulge has to be pushed back into place by a subsequent pressing operation, and since the subsequent pressing operation mutilates the scarf or kerf, a second kerfing operation is necessary. The nose or cutting point of the bit is invariably slightly wrinkled by reason of these operations. The method requires four distinct die forging stages and, as previously stated, the nose of the resulting tool is practically always misformed.

The present invention provides a method and apparatus by means of which cutter bits are formed two at a time. The defective formation of metal at the nose of the bit is entirely eliminated, and the operation is completed in three die-forging operations instead of four. Moreover, with the preferred embodiment of the invention, it is unnecessary to thereafter break the double blank in two, this being done in the forging of the blanks.

According to the present invention, a piece of bar stock is first formed with a diagonal kerf therein. After the kerf has been formed, the bar is subjected to lateral pressure to form an offset. This lateral bending operation after the scarfing step restores any metal, which has been bulged out by the scarfing step, back to its normal position. A final scarfing operation is performed after the lateral bending step to complete the formation of the bits, the scarfing operation preferably also effecting separation of the two parts of the blank into separate complete bits.

The invention may be readily understood by reference to the accompanying drawings, in which Figure 1 illustrates a length of bar stock which constitutes the original blank on which the succeeding operations are performed;

Figure 2 is a top plan view of the length of bar stock after the first kerfing or scarfing operation;

Figure 3 is a side elevation of the bar shown in Figure 2;

Figure 4 shows the bar between upper and lower bending dies at the conclusion of the lateral bending step, the bar being shown in elevation and only fragments of the dies being shown in section;

Figure 5 is a side elevation of the bar shown in Figure 4;

Figure 6 is a perspective view of the completed cutter bit;

Figure 7 is a view partly in elevation showing the upper and lower scarfing dies for forming the first scarf in the blank;

Figure 8 is a longitudinal section through the blank, the view being in the plane of line VIII—VIII of Figure 4;

Figure 9 is a transverse section through the forming die immediately after the blank has been severed into two pieces, but before the final shaping operation;

Figure 10 is a view similar to Figure 9 showing the two pieces at the conclusion of the final forging operation; and Figure 11 illustrates a modification wherein the blank is shaped to completion and thereafter intended to be severed, the view being a longitudinal section through the completed blank.

Referring first to Figure 6, it will be seen that the cutter bits which are formed by the present invention are of the conventional shape, having a rectangular shank A. The working end of this shank has a forwardly projected nose or cutting portion $a$ which tapers toward a point, the extreme point being designated $a'$. From the point $a'$ the working end of the bit tapers backwardly along the edge $a^2$.

According to the present invention a length of bar stock sufficient to form two cutter bits is first formed. This length of bar stock is shown in Figure 1 and is designated 10. It is of rectangular cross section, being wider than it is thick, and the cross section of the stock corresponding to the cross section of the shank of the resulting tool.

In carrying out the invention, the blank of Figure 1 is heated to a hot forging temperature. It is then placed in a press having upper and lower scarfing dies, as shown in Figure 7. In Figure 7, the blank is indicated at 10, the upper scarfing die is designated 11, and the lower scarfing die is designated 12. The upper scarfing die 11 is carried on a vertically movable press (not shown) while the die block 12 is supported on a fixed base 12a. The dies 11 and 12 have cooperating aligned scarfing surfaces 13 thereon, these scarfing surfaces extending in a direction diagonal to the longitudinal axis of the bar 10. When the die 11 is brought down by the operation of the press in which it is mounted, the cooperating die surfaces 13 function to form a deep kerf or scarf on each side face of the bar. This is shown in Figures 2 and 3 where the bar is shown as having two portions 10a and 10b connected by a relatively thin diagonal portion 10c, there being a diagonal scarf or kerf 10d on each face of the blank. While the blank is still hot and after the preceding operation has been completed, it is turned edgewise to the position shown in Figure 7 and again placed between upper and lower dies, as shown in Figure 4. The upper die is designated 14 and the lower die is designated 15. The upper die 14 is carried on the reciprocating head of a press, and is conveniently located on the same head on which the die 11 is located.

An inspection of Figure 2 reveals that the scarfing operation performed by the dies 11 and 12 tends to throw the portion 10b of the blank out of line with the portion 10a and it also bulges the metal out at the sides as indicated at 10e. When the blank is turned edgewise and placed on the die 15, the die 14 of Figure 4 is raised from the position shown in this figure. The die 15 has an upper level portion 15a and a lower level portion 15b, these two levels being connected by an incline 15c. The scarfed bar which is placed edgewise on the lower die 15 is positioned with the scarf portion located over the inclined portion 15c of the lower die 15 and with the kerf portion extending upwardly and to the right as shown in Figure 4. The upper die 14 has an upper level surface 14a, a lower level surface 14b and an inclined portion 14c, the portions 14a, 14b and 14c being parallel to the corresponding portions 15a, 15b and 15c of the lower die 15. After the scarfed blank has been placed on the lower die 15 in the position just described, the upper die 14 is moved down. The effect of this is first to squeeze or press back into place the bulges 10e of Figure 2. Then it offsets the two ends of the blank out of longitudinal alignment in a direction just opposite the direction of displacement in Figure 2. That is to say, comparing the blank as shown in Figure 4 with the blank as shown in Figure 2, the direction of the scarf in both figures is the same, but whereas the portion 10a is shown displaced upwardly from the portion 10b, it appears in Figure 4 as being displaced below the portion 10b. The operation corrects all the distortion formed by the kerfing operation and in addition produces the desired lateral offset between the two portions 10a and 10b of the bar. After the bar has been thus bent in the second pressing operation, either of two lines of procedure may be followed. According to the first of these, the portions 10a and 10b are separated and then pressed down to shape, while according to the second procedure, the bar may be again placed between kerfing dies generally similar to those shown in Figure 7, and the bar forged to the shape shown in Figure 11.

The first and preferred procedure is illustrated in Figures 9 and 10. In Figures 9 and 10 there is shown an upper die 16 carried on a pressing head 17 and there is shown a lower box die 18 carried on a fixed support 19. The die 16 has a diagonal shearing edge 16a and at each side of this shearing edge are rounded forming surfaces 16b and 16c. The lower die 18 is similarly provided with a cooperating diagonally extending shearing edge 18a, a curved forming surface 18b and a curved forming surface 18c. The shearing edges 16a and 18a are formed with vertical faces turned in opposite directions so that these faces may ride past each other in the operation of the dies. After the blank has been offset by the step described in connection with Figure 4, and while it is still hot, it is placed between the dies 16 and 18 while the die 16 is in an elevated position, with the scarfed or kerfed portion resting on the shearing edge 18a. The upper die 16 is then moved down. In moving down, the cutting edge 16a forces the portion 10a of the blank down with respect to the portion 10b, entirely shearing the two portions of the blank. The die 16 continues its downward movement, squeezing the sheared ends of the two blanks down to the final shape shown in Figure 10. In Figure 10, the dies 16 and 18 are entirely closed and the formation of the two bits is completed. It will be seen by comparing these two figures that the sheared ends of the blanks are brought more nearly to a point. The shearing occurs, of course directly along the line of scarfing, with the result that two complete bits of the shape shown in Figure 6 are simultaneously formed.

According to the modified way of forming the bits, the blank, after it has been brought to the shape shown in Figures 4 and 5, is placed between upper and lower dies similar to the dies 11 and 12 of Figure 7. These second scarfing dies deepen the kerfs 10d beyond the depth formed by the first scarfing operation, giving the blank the smooth curved edges desired. The blank can then be snapped on the line of the kerf into two complete cutting bits.

In carrying out the invention, it will be seen that the two bits are formed from an integral length of stock in three complete pressing operations which can be performed in rapid sequence. The first scarfing operation is done on the straight piece of stock and the kerfs are formed to a considerable depth. It is preferred, however, that the connecting portions 10c be left thick enough so that when the bending operation of Figure 4 is performed the desired offset of the two sections will take place without mutilation of the metal. If the portion 10c is too thin, the offsetting operation of Figure 4 is likely to produce distortion of the metal. The offsetting operation of Figure 4 serves to overcome the bulge produced by the first kerfing operation and to reverse the direction of offset from that which occurs by the action of the kerfing dies of Figure 7. In the last operation, the metal is so nearly to the proper shape that very little work is required to complete the shaping of the two cutter bit portions.

In the preferred operation, the kerfed blank produced according to Figure 4, is sheared with little effort and the ends of the blanks are easily forged to the finished shape. By shearing the blanks prior to the final shaping operation, the final shaping operation is performed on separate articles and a bit of a good shape is produced. Using a box die for the final kerfing operation, the metal is confined against lateral distortion in the second kerfing operation.

While I have illustrated certain specific forms of dies, it will be understood that this is by way of illustration and that slight changes and modifications may be made in the shape of the dies within the contemplation of my invention and under the scope of the following claims.

I claim:

1. The method of forming two mining machine cutter bits having offset cutting end portions from a single length of rectangular bar stock, which comprises first pressing the bar stock while hot between cooperating diagonal kerfing dies, thereafter subjecting the side edges of the bar to pressure to remove the bulges produced by said kerfing operation and to offset the opposite ends of the bar in a direction reverse to the slight offset produced by the diagonal kerfing dies, and thereafter further forging the kerfed end portions of the bar to deepen the kerf and more completely form the bits and separating the bar along the line of the kerf.

2. A method of forming mining machine bits in which two bits are finished at one heating of the metal with three strokes of a forging press, the first forming registering diagonal scarfs in the opposite wide faces of a blank, the second laterally offsetting edgewise the two halves of the blank at the point of scarf and restoring the distorted metal on the edges of the blank caused by scarfing, and the third stroke shear-separating and finish-forming the cutting ends of the two bits.

CECIL R. ANDERSON.